(12) United States Patent  
Heslip

(10) Patent No.: US 7,184,701 B2
(45) Date of Patent: Feb. 27, 2007

(54) STRINGED MUSICAL INSTRUMENT LEARNING AID AND METHODS

(75) Inventor: Stephen Heslip, 3363 Redwing Dr., Oceanside, CA (US) 92054

(73) Assignee: Stephen Heslip, Oceanside, CA (US)

( * ) Notice: Subject to any disclaimer, the term of this patent is extended or adjusted under 35 U.S.C. 154(b) by 398 days.

(21) Appl. No.: 10/624,846

(22) Filed: Jul. 22, 2003

(65) Prior Publication Data

US 2005/0016365 A1 Jan. 27, 2005

(51) Int. Cl.
*G09B 5/00* (2006.01)
(52) U.S. Cl. .............................. 434/307 R; 434/307 A; 84/470 R
(58) Field of Classification Search .... 434/307 A–309, 434/350, 404, 405, 307 R; 84/470 R, 471 R, 84/471 SR, 472, 474, 477 R, 485 R, 603, 84/485 SR See application file for complete search history.

(56) References Cited

U.S. PATENT DOCUMENTS

| | | | | |
|---|---|---|---|---|
| 2,649,008 A * | 8/1953 | Bova et al. | .................... | 84/474 |
| 3,592,099 A * | 7/1971 | Gibby | ......................... | 84/473 |
| 3,668,967 A * | 6/1972 | Malis | ....................... | 84/471 R |
| 3,854,370 A * | 12/1974 | Sapinski | .................... | 84/485 R |
| 3,960,046 A * | 6/1976 | Choong | .................... | 84/471 R |
| 4,002,097 A * | 1/1977 | Leonard | .................... | 84/471 SR |
| 4,037,518 A * | 7/1977 | Garcia Lorenzen | .......... | 84/474 |
| 4,069,737 A * | 1/1978 | Andersson | ............. | 84/485 SR |
| 4,175,468 A * | 11/1979 | Whitlock | ................ | 84/485 SR |
| 4,286,495 A * | 9/1981 | Roof | ......................... | 84/485 R |
| 4,503,748 A * | 3/1985 | Barber, Jr. | .................... | 84/474 |
| 4,716,806 A * | 1/1988 | Forrest | ......................... | 84/474 |
| 4,961,362 A * | 10/1990 | Gunn | ......................... | 84/474 |
| 5,173,566 A * | 12/1992 | Hiraoka | ....................... | 84/474 |
| 5,270,475 A * | 12/1993 | Weiss et al. | .................. | 84/603 |
| 5,288,234 A * | 2/1994 | Hamzi | ......................... | 434/404 |
| 5,320,020 A * | 6/1994 | Corley | ......................... | 84/474 |
| 5,370,539 A * | 12/1994 | Dillard | ....................... | 434/405 |
| 5,585,583 A * | 12/1996 | Owen | ....................... | 84/470 R |
| 5,690,496 A * | 11/1997 | Kennedy | ................. | 434/307 R |
| 5,709,552 A * | 1/1998 | LeGrange | .................... | 434/404 |
| 6,031,172 A * | 2/2000 | Papadopoulos | ........... | 84/470 R |
| 6,107,557 A | 8/2000 | Fukada | | |
| 6,188,008 B1 * | 2/2001 | Fukata | ....................... | 84/470 R |
| 6,201,174 B1 * | 3/2001 | Eller | ......................... | 84/477 R |
| 6,265,651 B1 * | 7/2001 | Landtroop | ................ | 84/471 R |
| 6,271,453 B1 | 8/2001 | Hacker | | |
| 6,288,315 B1 * | 9/2001 | Bennett | ..................... | 84/470 R |
| 6,751,439 B2 * | 6/2004 | Tice et al. | .................. | 434/350 |
| 6,841,724 B2 * | 1/2005 | George | ..................... | 84/477 R |

* cited by examiner

*Primary Examiner*—Joe H. Cheng
(74) *Attorney, Agent, or Firm*—Duckor Spradling Metzger & Wynne; Bernard L. Kleinke

(57) ABSTRACT

A learning aid and a method of making and using it are disclosed, and relate to the configuring of chord indicia in an ordered sequence to designate groups of chords for certain given musical keys. The chord indicia and musical key indicia are arranged in a matrix. The matrix is arranged in overlapping columns, and each column is designated with an individual one of the musical key indicia. The columns are arranged such that each group of chords comprises a plurality of columns such that each key indicia comprises a designated column and at least one adjacent other key column.

12 Claims, 4 Drawing Sheets

STRINGED MUSICAL INSTRUMENT LEARNING AID AND METHODS

FIELD OF THE INVENTION

The present invention relates in general to a stringed musical instrument learning aid and methods of making and using it. It more particularly relates to such a learning aid, which is useful in connection with learning to play stringed musical instruments such as guitars.

BACKGROUND ART

It is to be understood that there is no admission that the background art described in this section is legally considered to be prior art.

Learning to play musical instruments such as stringed instruments oftentimes is difficult and challenging for some people. Thus, a variety of different types and kinds of learning aids and other devices and systems have been employed in an attempt to facilitate the learning process.

Among the numerous examples of such devices and methods, a reference may be made to the following U.S. Pat. Nos. 3,960,046; 5,585,583; 6,031,172 and 6,265,651.

While many different types and kinds of teaching devices and methods have been employed, there have been problems for some beginners in learning to play the guitar due to the fact that numerous musical keys and associated chords must be learned. Sometimes it is even difficult for the beginner to know where to start the learning process. There are number keys, and each such key has a large number of possible chords associated with it. Thus, it may be difficult, if not impossible, for many people to learn all of the chord combinations for a variety of different keys, that could be played on a guitar.

Thus, it would be highly desirable to have a learning aid and a method for facilitating the learning of the playing of a stringed instrument such as a guitar.

BRIEF DESCRIPTIONS OF THE DRAWINGS

Figure 1:
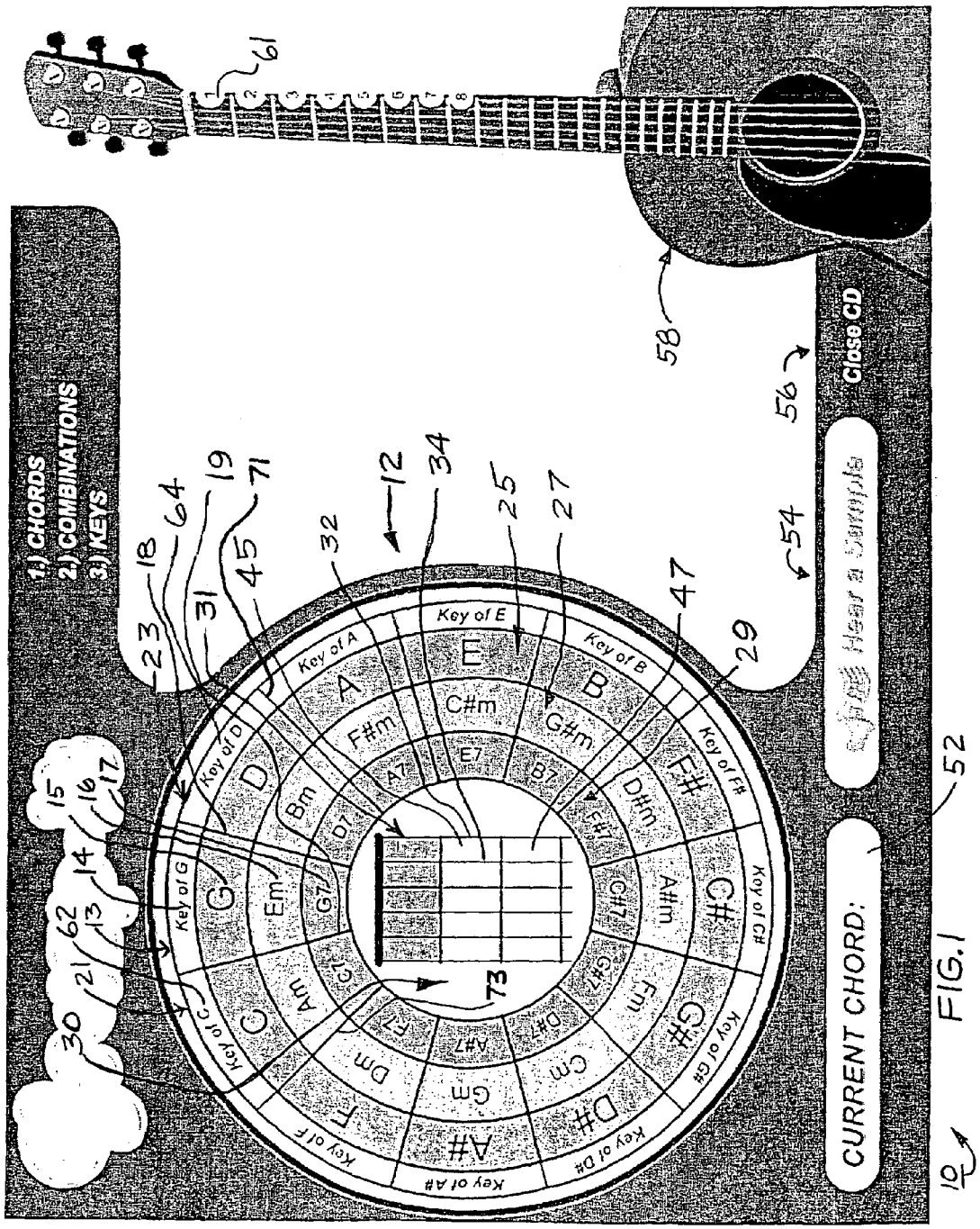
Figure 2:
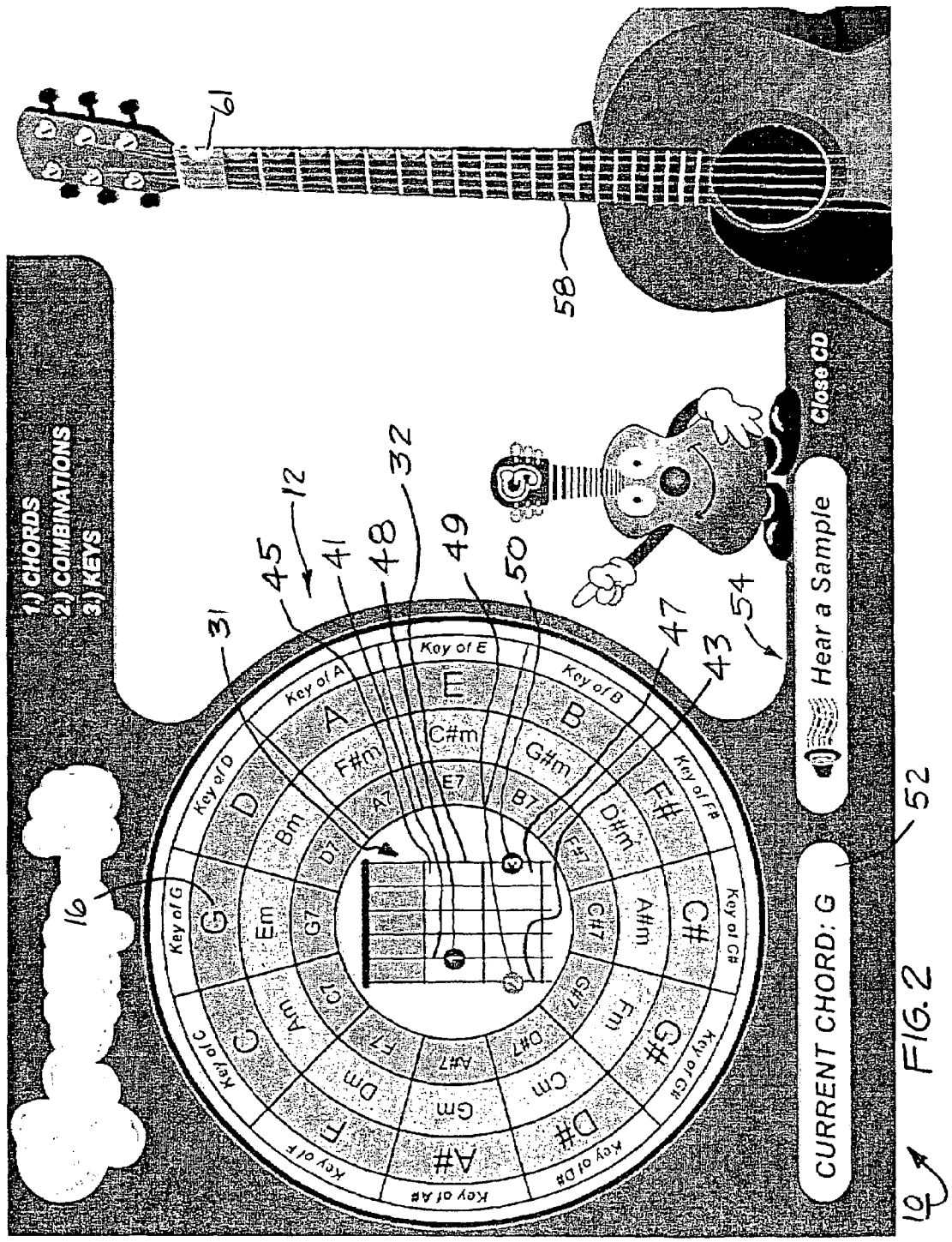
Figure 3:
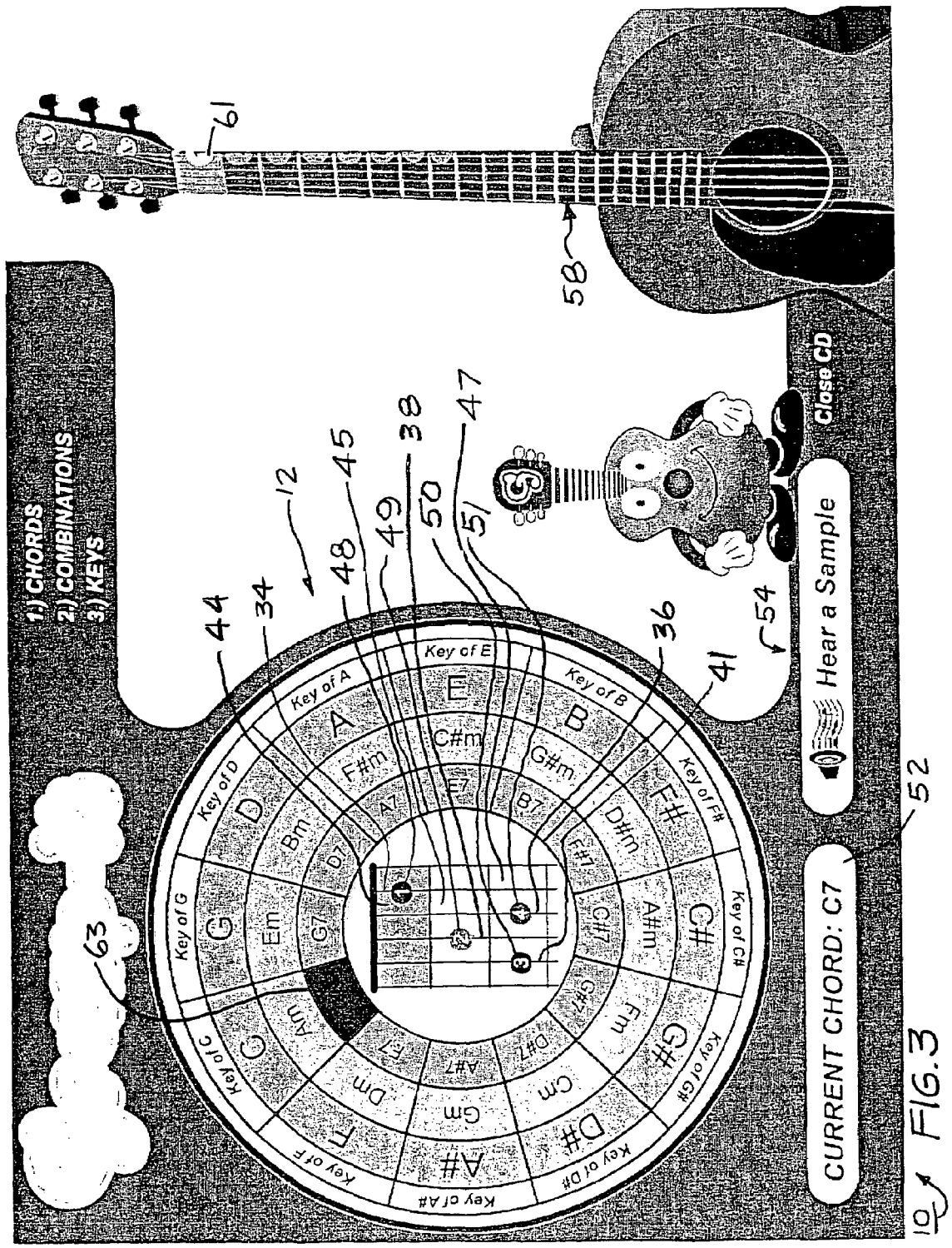
Figure 4:
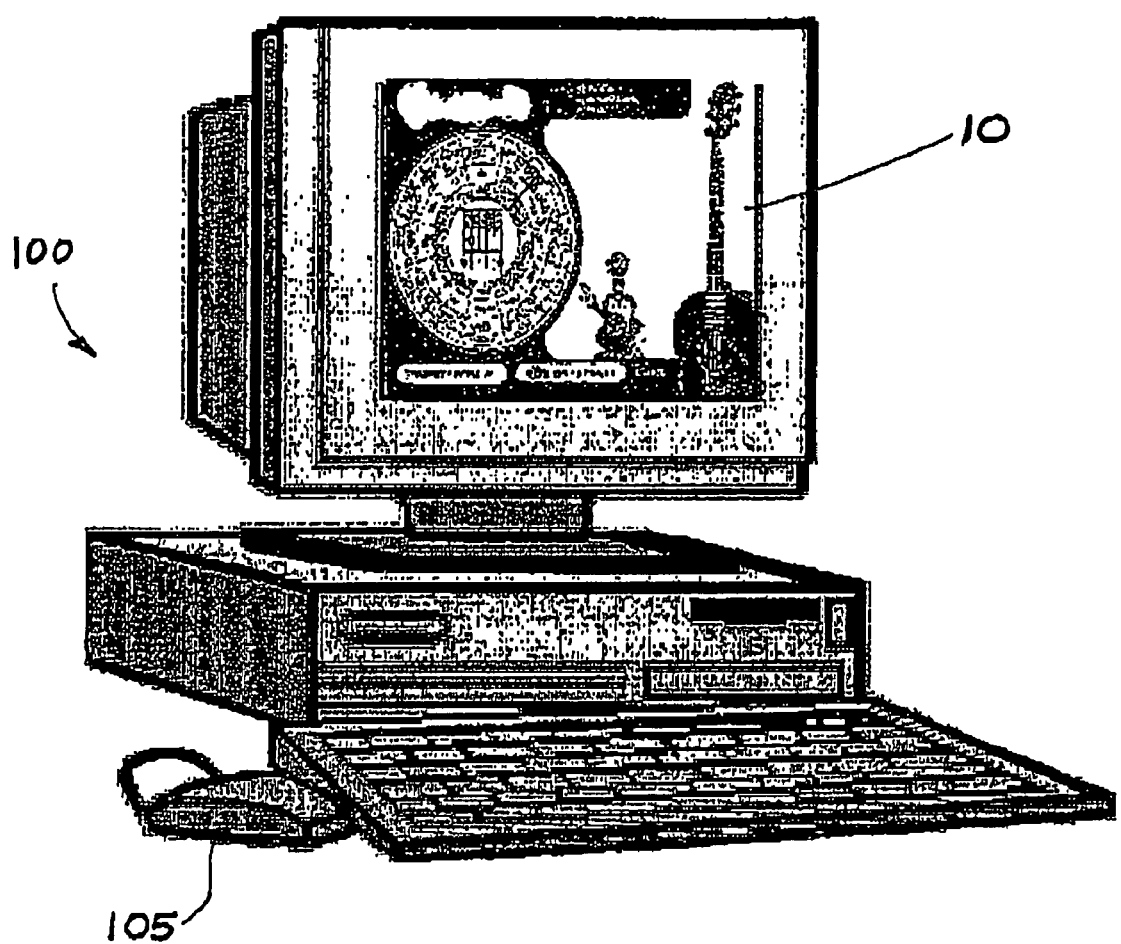

FIG. 1 is a pictorial face view of a learning aid, which is constructed in accordance with an embodiment of the present invention;

FIGS. 2 and 3 of the drawings illustrate various modes of operation of the learning aid of FIG. 1, and FIG. 4 is a perspective view of the learning aid of FIG. 1 displayed using a computer.

DETAILED DESCRIPTION OF CERTAIN EMBODIMENTS OF THE INVENTION

A learning aid and a method of making and using it are disclosed, and relate to the configuring of chord indicia in an ordered sequence to designate groups of chords for certain given musical keys. The chord indicia and musical key indicia are arranged in a matrix. The matrix is arranged in overlapping columns, and each column is designated with an individual one of the musical key indicia. The columns are arranged such that each group of chords comprises a plurality of columns such that each key indicia comprises a designated column and at least one adjacent other key column.

Referring now to the drawings, and more particularly to FIG. 1 thereof, there is shown a learning aid 10, which is constructed in accordance with an embodiment of the invention, and which is adapted to facilitate assisting a person to learn to play a stringed instrument such as a guitar. In the disclosed example of the embodiments of the invention, the learning aid 10 is used to learn to play a guitar, and is In the form of an interactive computer generated display on computer 100 as shown in FIG. 4. It will become apparent to those skilled in the art that the devices and methods disclosed herein for learning to play the guitar are examples of various embodiments of the invention, and that there are other types and kinds of stringed instruments which may also be learned by employing other examples of embodiments of the present invention not disclosed herein. While it is presently preferred to embody the learning aid In the form of computer generated displays, it is also contemplated within the true spirit and scope of the present invention to embody the principles of the disclosed embodiments of the invention in other media such as the print media where the devices as disclosed herein may be displayed as part of a book, or other printed device.

As shown in FIG. 1, the learning aid 10 includes a circular matrix indicia 12 having a series of radial column indicia for various musical keys. For example, a radial column indicia 13 designates chords for the key of G. The column indicia 13 generally includes a musical key-of-G indicia 14 at the outer rim of the matrix indicia 12. At three radially spaced-apart positions or rows within the column 13, there is designated three primary chords such as the primary chords G, Em and G7. In this regard, there are three radially spaced-apart rows containing a G chord indicia 15, an Em chord indicia 16 and a G7 chord indicia 17. These three chords are primary chords and are respectively a major chord, a minor chord and a seventh chord. These three primary chords correspond to a musical key of G.

The radial column indicia 13 is defined by a pair of radial lines 18 and 19. In a similar manner, there are a total of 12 key radial column indicia disposed radially about the circular matrix indicia 12. For example, a pair of radial column indicia 21 and 23 flank the key-of-G radial column indicia 13. In this regard, the radial line 18 separates the key-of-G column 13 and the key-of-D column indicia 23. Similarly, the radial line 19 separates the key-of-C column 21 and the key-of-G column 13.

There are three annular concentric row indicia 25, 27 and 29 of the circular matrix indicia 12 for the radial columns. Each annular concentric row designates a different primary chord. In this regard, the outer concentric row indicia 25 includes major chord indicia such as the G chord indicia 15. The intermediate concentric row 27 includes the minor chord indicia such as the Em chord indicia 16. The innermost concentric row 29 includes the seventh chord indicia such as the G7 chord indicia 17.

At a central circular space 30 enclosed within the innermost concentric row 29, there is disposed a chord position indicia generally 31 which is configured to represent a portion of a guitar having six strings as represented by string indicia 32, 34, 36, 38, 41 and 43. As shown in the drawings associated with the disclosed embodiments of the invention, only three fret indicia 44, 45 and 47 are shown as forming the chord position indicia 31 in the central circular space 30. It will become apparent to those skilled in the art that there may be a different number of strings and frets illustrated in the learning device of various different embodiments of the present invention.

Also, disposed within the central circular space 30 and forming a part of the chord position indicia 31, are a series of finger position indicia, such as the finger position indicia 48, 49, 50 and 51 illustrated in FIGS. 2 and 3 for the major chord G and the seventh chord C7, respectively. The finger position indicia are generally circular in configuration and have a number associated with them. For example, as shown in FIG. 2, the finger position indicia 48 is circular and includes the number "1". The number "1" represents the index finger, and the numbers "2" through "4" of the indicia 49, 50 and 51 designate the respective middle, ring and small fingers on the hand of the user. In this manner, the chord position indicia 31 displays how a given chord is played.

In use, a chord is selected by clicking on a chord indicia such as a chord G indicia 16 to display the finger position indicia 48, 49 and 50 for the corresponding fingers of the hand for grasping the guitar to play the major chord G. In this regard, the finger position indicia 48 is displayed oh the string indicia 41 at the fret 45. The finger position indicia 49 is displayed on the string indicia 43 within the fret 47. Additionally, a current chord display indicia Indicated at 52 displays the chord "G" for designating to the user the chord finger position currently being displayed. A hear-a-sample button indicia 54 can be selected by a mouse 105 (FIG. 4) to hear a computer generated chord G sound for the user. A close CD button indicia 56 may be selected to exit the program for the learning aid 10.

Similarly as shown in FIG. 3, when the C7 indicia is clicked, the finger position indicia 48, 49, 50 and 51 are displayed on the appropriate string and fret positions for a C7 chord.

In order to illustrate the different frets within the central circular space 30, a guitar indicia 58 has fret number indicia such as a fret number indicia 61 to designate various different frets for a guitar so that the fret indicia disposed within the central circular space 30 can be changed to illustrate other frets for the guitar when certain chords are selected.

It is contemplated that the matrix indicia 12 may also be configured in other non-circular configurations. The matrix indicia is used to designate groups of chords for certain given musical keys. The chord indicia and musical key indicia are arranged in the form of a matrix in overlapping columns, and each column is designated with an individual one of the musical key indicia. In the present example of the embodiment disclosed herein, the columns are arranged such that each group of chords comprises a plurality such as three columns such that each key indicia comprises a center column flanked by a pair of other key columns. In this regard, as shown in FIG. 2, when the key of G is selected, there are nine chords which correspond to the key of G. The nine chords are designated by the indicia in the key-of-C column indicia 21, the key-of-G column indicia 13, and the key-of-D column indicia 23. In this regard, the nine chords corresponding to the key of G are the three major chords C, G and D, the minor chords Am, Em and Bm and the seventh chords C7, G7 and D7. Thus, should a person then wish to learn the chords associated with the key of C, a key-of-C indicia 62 at the outermost rim portion of the radial column 21 can be selected such as by using a mouse, and then the column indicia 21 rotates to the top position previously occupied by the column indicia 13. The user then realizes that he or she has already learned six of the nine principal chords associated with the key of C since six of the key of C chords are found in the column indicia 21 and 13. Thus, the user will only need to learn chords F, Dm and F7 to then know all of the nine major chords for the key of C.

Similarly, the user then will learn the major chords associated with the key of D by selecting the key-of-D indicia 64 to cause the column indicia 23 to rotate to the central upper position formerly occupied by the columns 13 and 21. In this manner, the user then realizes that it is only necessary to learn three additional new chords for the key of D. In this regard, only the chords A, F#m, and A7 need to be learned. This ordered sequence can then be followed to learn the additional chords of other keys such as the key of F and the key of A.

In use, a user of the learning aid 10 may want to first learn the different keys for the guitar. A key is a level of pitch, which can be adjusted upwardly or downwardly to suit the user's range of voice. Keys are identified using letters such as "G", "C", and "D". It is recommended that these three keys be learned first. The learning aid 10 enables the user to distinguish each of the different keys by the key indicia at the outer rim of the circular matrix indicia 12. The keys of G, C and D are considered by some as being the easiest to grasp and the most widely played.

The user can observe, or choose to point and click his or her mouse button on any of the key indicia of G, C or D, on the outer rim of the circular matrix indicia. According to one example of the invention, the selected radial column, such as the column 13, rotates to the top central position of the circular matrix indicia. At the same time, a group of chords thus line up underneath and appears inside a glass-like window extending between the indicia lines 71 and 73 (FIG. 1), or otherwise highlighted or featured to identify the nine chords associated with the designated key. In this manner, groups of chords can be learned, rather than by learning hundreds or thousands of chords in a random manner. By utilizing the learning aid 10, each key has its own chord group. Although there are nine primary chords in each key, many songs can be played using only three or four of the chords for any given key. A beginning student may use a songbook (not shown) which shows the chords above the words to help the student to learn to play a given song.

There are three types of chords: majors, minors and sevenths. These are also known as primary chords. All chords are rooted in primary chords. Primary chords are the first chords from which other chords originate. It is desirable to learn these chords first. The matrix indicia enables the user to distinguish the chord groups. To help distinguish the groups, the indicia can be color coded. For example, majors are in red, minors are in green and sevenths are in blue.

The most effective as well as the most efficient way to begin playing the guitar is by learning combinations of chords. Each combination consists of nine chords in a group for each of the 12 keys. That sounds like you need to learn a total of 12×9=108 chords for 12 keys. However, the system makes it possible for you to learn 12 keys with an ordered sequence of chords instead of learning 108 chords randomly. According to an embodiment of the invention, the user can focus on learning one combination of chord groups at a time. If the beginning student only learns one combination of chord groups initially, i.e., the key of "G", which consists of nine chords, the student would be able to play hundreds of songs from this one key alone.

The system wheel arranges groups of chords in their different keys. Some chords appear in more than one key. The system will show you every place where chords appear in their different keys. For example, the chord "G" appears in all three keys of "G", "C" & "D" mentioned above. So does "Em" and "G7". When you learn the nine chords in "G", first, the user only needs to learn three new chords in the key of "C". This is because the user will have already learned six of the chords in the key of "C" from those in the key of "G". Similarly, the key of "D" can be selected and learned next, and only three new chords are required to be learned. Doing it this way means you will be able to play in three different keys, having learned only fifteen chords instead of twenty-seven (9 chords times 3 keys).

This same principle applies for all twelve keys. Learning primary chords according to their combination of chord groups is an ordered sequence according to the disclosed examples of the present invention facilitates the learning of chords for playing a stringed instrument. Such techniques may be more productive for users than learning to play by merely randomly selecting chords from different chord groups. This is because there is very little relationship between chords from different groups. It is difficult for some people to learn chords randomly as it may take much longer to learn and the user may get frustrated. By utilizing the disclosed techniques, the user can practice by learning one combination of chord groups at a time.

It is to be understood that there can be many different modifications and other embodiments which fall within the true spirit and scope of the present invention. Therefore, the invention should be limited only by the appended claims.

What is claimed is:

1. A learning aid for use on a computer to facilitate learning to play a stringed musical instrument, comprising:
   a circular matrix being displayed on the computer and having a plurality of columns and a plurality of rows;
   wherein the columns of the matrix are musical key columns and are associated with a group of different musical keys and the rows of the matrix are associated with an ordered set of different chords, wherein each column includes a musical key indicia representing one of the musical keys and primary chord indicia representing primary chords corresponding to the one of the musical keys, wherein the columns are organized so that a pair of columns adjacent to opposite sides of a first musical key column, having a first musical key, include chords of a chord combination corresponding with the first musical key, and wherein the chords of the first column and of the pair of adjacent columns comprise a chord combination for the first musical key;
   chord position indicia being displayed on the computer and configured to represent a plurality of strings of the musical instrument;
   finger position indicia being displayed on the computer and positioned relative to the strings of the chord position indicia to display how selected ones of the chords of the chord combinations are to be played;
   wherein the entire circular matrix is rotated to locate a selected one of the key indicia at a top position of the displayed matrix such that the selected key indicia and a chord combination of chord indicia associated with the selected key indicia are disposed at the top of the displayed matrix to be easily viewed and differentiated from the other chords; and
   wherein one of the chords of the chord combination associated with the selected key indicia is selected by a user, and displayed on the computer in response to the selecting of one of the chords is a given finger position indicia disposed relative to the chord position indicia to illustrate how to play the selected chord of the selected chord combination.

2. The learning aid of claim 1, wherein the circular matrix comprises a series of radial columns and concentric annular rows.

3. The learning aid of claim 1, wherein each column includes three chords, and each chord combination includes nine chords.

4. The learning aid of claim 1, further including current chord display indicia.

5. The learning aid of claim 3, wherein the circular matrix comprises 12 keys columns and a total of 36 chords.

6. The learning aid of claim 1, further including fret number indicia.

7. The learning aid of claim 1, wherein the types of chords in each column include major, minor, and seventh.

8. A method for use on a computer for facilitating the learning to play a stringed musical instrument, comprising:
   displaying on the computer a circular matrix having a plurality of columns and a plurality of rows;
   wherein the columns of the matrix are musical key columns and are associated with a group of different musical keys and the rows of the matrix are associated with an ordered set of different chords, wherein each column includes a musical key indicia representing one of the musical keys and primary chord indicia representing primary chords corresponding to the one of the musical keys, wherein the columns are organized so that a pair of columns adjacent to opposite sides of a first musical key column, having a first musical key, include chords of a chord combination corresponding with the first musical key, and wherein the chords of the first column and of the pair of adjacent columns comprise a chord combination for the first musical key;
   displayed on the computer chord position indicia configured to represent a plurality of strings of the musical instrument;
   displayed on the computer finger position indicia positioned relative to the strings of the chord position indicia to display how selected ones of the chords of the chord combinations are to be played;
   rotating the entire circular matrix to locate a selected one of the key indicia at a top position of the displayed matrix such that the selected key indicia and a chord combination of chord indicia associated with the selected key indicia are disposed at the top of the displayed matrix to be easily viewed and differentiated from the other chords; and
   wherein one of the chords of the chord combination associated with the selected key indicia is selected by a user, and displayed on the computer in response to the selecting of one of the chords is a given finger position indicia disposed relative to the chord position indicia to illustrate how to play the selected chord of the selected chord combination.

9. The method of claim 8, wherein the circular matrix comprises a series of radial columns and concentric annular rows.

10. The method of claim 8, further including using current chord display indicia.

11. The method of claim 8, further including using fret number indicia.

12. The method of claim 8, wherein the types of chords include major, minor, and seventh.

* * * * *